United States Patent [19]

Bobeczko

[11] Patent Number: 5,692,700
[45] Date of Patent: Dec. 2, 1997

[54] COVERS FOR WELDING WIRE REELS

[75] Inventor: James D. Bobeczko, Concord Township, Ohio

[73] Assignee: The Lincoln Electric Company, Cleveland, Ohio

[21] Appl. No.: 619,368

[22] Filed: Mar. 21, 1996

Related U.S. Application Data

[62] Division of Ser. No. 200,388, Feb. 23, 1994, Pat. No. 5,553,810.

[51] Int. Cl.$^6$ .......................... B65H 75/00; B65H 75/30
[52] U.S. Cl. ..................... 242/588.2; 242/129.8; 242/588.6; 242/598; 242/6; 206/409
[58] Field of Search ................... 242/601, 605, 242/588.2, 588.3, 588.5, 588.6, 596.8, 597.8, 598.6, 129, 129.5, 129.8, 130, 132, 134, 137, 137.1, 138, 141, 146, 170, 171; 206/53, 397, 403, 404, 405, 406

[56] References Cited

U.S. PATENT DOCUMENTS

| | | |
|---|---|---|
| 1,029,518 | 6/1912 | Temple . |
| 1,685,392 | 9/1928 | Beadle . |
| 1,898,857 | 2/1933 | Theiss . |
| 1,937,468 | 11/1933 | Talbot ........................... 206/46 |
| 2,191,849 | 2/1940 | Debrie ........................... 242/601 |
| 2,515,669 | 7/1950 | Scholl ........................... 206/398 |
| 2,834,507 | 5/1958 | Metzler et al. ........................... 242/601 |
| 2,948,575 | 8/1960 | Kallman et al. ........................... 242/588.6 |
| 3,136,415 | 6/1964 | Sandstrom ........................... 242/588.3 |
| 3,231,081 | 1/1966 | Elterman ........................... 206/398 |
| 3,286,829 | 11/1966 | Lyman et al. ........................... 206/401 |
| 3,341,001 | 9/1967 | Barclay et al. ........................... 206/398 |
| 3,515,269 | 6/1970 | Furtado . |
| 3,521,747 | 7/1970 | Katz ........................... 206/53 |
| 3,602,455 | 8/1971 | Lewis ........................... 242/129 |
| 3,603,528 | 9/1971 | Kinglsey et al. ........................... 242/601 |
| 3,612,427 | 10/1971 | Bishop ........................... 242/137.1 |
| 3,700,185 | 10/1972 | Hubbard et al. . |
| 3,810,588 | 5/1974 | Mahoney . |
| 3,819,847 | 6/1974 | Charles ........................... 242/129 |
| 3,983,997 | 10/1976 | Warshaw ........................... 206/389 |
| 4,069,958 | 1/1978 | Strauss ........................... 242/588.3 |
| 4,475,652 | 10/1984 | Heard ........................... 242/588.3 |
| 4,520,966 | 6/1985 | Bloch et al. . |
| 4,521,670 | 6/1985 | Case, Jr. et al. ........................... 219/130.01 |
| 4,553,707 | 11/1985 | Henrich ........................... 242/25 R |
| 4,591,110 | 5/1986 | Wirts et al. ........................... 242/129.8 |
| 4,606,134 | 8/1986 | Flick ........................... 206/409 |
| 4,664,260 | 5/1987 | Stokes . |
| 4,754,878 | 7/1988 | Bose ........................... 206/398 |
| 4,856,726 | 8/1989 | Kang ........................... 242/405.3 |
| 5,062,580 | 11/1991 | Meagher ........................... 242/125.2 |
| 5,139,209 | 8/1992 | Kramer ........................... 242/118.7 |
| 5,165,543 | 11/1992 | Heyda et al. ........................... 206/400 |

FOREIGN PATENT DOCUMENTS

| | | | |
|---|---|---|---|
| 1032361 | 7/1953 | France | ........................... 206/402 |
| 2078735 | 10/1971 | France . | |

*Primary Examiner*—John M. Jillions
*Attorney, Agent, or Firm*—Vickers, Daniels & Young

[57] ABSTRACT

A cover for a reel of welding wire comprises a sleeve having axially opposite ends extending across the outer peripheries of the flanges of the reel and having radially inwardly open circumferentially extending recesses interengaging with the flanges to releasably axially retain the sleeve on the reel and to seal the space between the flanges so as to protect welding wire wound about the hub of the reel between the flanges from exposure to air and moisture. Seals are provided between the recesses and reel flanges for the latter purpose. In accordance with another embodiment, the cover comprises two portions which snap-lock together to completely enclose the reel. The reel and cover are relatively rotatable and in accordance with another aspect of the invention the cover can remain on the reel during use and is provided with an integral or detachable nose which supports the wire during unwinding thereof from the reel.

37 Claims, 10 Drawing Sheets

5,692,700

COVERS FOR WELDING WIRE REELS

This is a division of application Ser. No. 200,388 filed Feb. 23, 1994, now U.S. Pat. No. 5,553,810.

BACKGROUND OF THE INVENTION

This invention relates to the art of welding and, more particularly, to covers for protecting electric welding electrode wire wound on a reel.

As is well known in the art of continuous electric arc welding, a continuous length of welding electrode wire, which is not electrically hot, is wound onto a reel and is fed therefrom to the point of welding by an appropriate feeding mechanism which progressively unwinds the wire from the reel. After the wire is initially wound on the reel, and prior to its use in the foregoing manner, the reel of wire can be stored for a considerable period of time during which, unless appropriately protected, the wire is exposed to ambient air and moisture and thus subject to oxidation, discoloration, physical damage, or the like, all of which can render the wire commercially unacceptable even though it may be perfectly acceptable for the intended welding function. Even though such defects may only appear on the outermost convolutions of the wire in that those convolutions therebeneath are somewhat protected thereby, users of the wire are sometimes not willing to risk product quality or to discard an initial portion of the wire to avoid such risk, whereby the entire reel of wire is rendered unacceptable.

In addition to the foregoing problems, it is desirable in connection with shipping and storage of welding wire reels to vertically stack a number of the reels flange-to-flange and, in connection therewith, it is difficult to maintain adjacent reels in vertical alignment in that the flanges thereof are smooth and thus promote lateral sliding therebetween. Therefore, unless the reels are in some manner supported against relative lateral displacement when stacked, and upper one or more of the reels can slide off of the reel or reels therebeneath and, in falling therefrom, can impact against an underlying support surface, or a person, damaging the reel and the wire thereon and/or injuring the person due to the size and weight of the reel with a full supply of welding wire thereon.

SUMMARY OF THE INVENTION

In accordance with the present invention, the foregoing and other problems encountered in connection with storage reels for welding electrode wire are minimized or overcome by providing the reel with a cover which, in accordance with one aspect of the invention is in the form of a sleeve axially received across the flanges of the reel and interengaging therewith to releasably hold the cover on the reel and to seal the space between the hub and flanges of the reel from the ingress of moisture and air, thus to protect the welding wire. In accordance with another aspect of the invention, one end of the cover is contoured so as to be axially received in the second end of an adjacent cover so that a plurality of covered reels can be vertically stacked and interengaged against relative lateral displacement therebetween. The cover and reel flanges interengage with a snap-fit and, preferably, sealing against the ingress of moisture and air is enhanced by a resilient gasket or sealant between the reel flanges and cover. Further, it will be appreciated that the snap-fit interrelationship between the cover and reel provides for both of these components to be reusable if desired.

The cover can be removed from the reel at the time of use or, in accordance with yet another aspect of the invention, the cover can remain on the reel during use. In connection with the latter, the cover is provided with an arrangement for supporting and guiding the wire as it unwinds from the reel during feeding of the wire to the welding station. More particularly in this respect, the wire passes through an opening in the outer periphery of the cover and, during feeding of the wire to the welding station, the reel rotates relative to the cover as the welding wire is played from the reel. Preferably in connection with this aspect of the invention, the opening is provided with a sealing arrangement engaging about the wire extending therethrough to enhance sealing of the interior of the cover and to restrain the free end of the wire from retracting into the cover prior to or during use. Furthermore, the reel and cover can be interengaged to preclude relative rotation therebetween in the direction which would wind the wire onto the reel to preclude retraction of the wire into the cover both prior to and during use.

In accordance with yet a further aspect of the invention, the cover is in the form of a two-piece cassette in which the two cover portions completely enclose the reel and are in snap-locked interengagement with one another. This cover remains on the reel during use and includes an inner tubular wall which extends through a bore in the reel hub and which is adapted to receive a mandrel by which the cover and reel are mounted at the wire supply station of the welding apparatus. The cover advantageously includes a handle by which the covered reel can be carried, and a plurality of the covered reels are adapted to be vertically stacked in nested relationship to preclude relative lateral displacement and relative rotation therebetween. The two cover portions together provide a nose including an opening for dispensing welding wire from the reel, a positioning arrangement for positioning the wire relative to the opening as the wire is played from the reel, and a sealing arrangement which clampingly engages against the wire to enhance sealing of the interior of the cover, to act as a drag brake to maintain a constant tension on the wire as it is played from the reel, and to restrain retraction of the wire into the cover. The nose further advantageously accommodates a package or packages of a desiccant material for absorbing moisture within the cover, thus to further protect the welding wire. The cassette cover arrangement greatly enhances transportation and storage of welding wire reels as well as protection of the welding wire from physical damage and/or exposure to air and moisture both prior to and during use thereof in conjunction with a welding operation. Moreover, the two-piece cover arrangement provides for both the cover and the reel to be reusable if desired.

It is accordingly an outstanding object of the present invention to provide a cover for a reel of electric arc welding electrode wire which protects the wire from physical damage and from exposure to air and moisture.

A further object is the provision of a cover of the foregoing character which is removably mounted on a reel of welding wire and which, when mounted thereon, seals the space between the flanges and thus protects welding wire wound on the reel from exposure to air and moisture.

Another object is the provision of a cover of the foregoing character wherein the opposite ends of the cover are contoured to provide for two or more covered reels to be vertically stacked with the covers axially interengaged to preclude relative lateral displacement therebetween.

Yet another object is the provision of a cover of the foregoing character which engages with the flanges of the reel to releasably hold the cover thereon and to seal the space between the flanges to protect welding wire wound on the reel from exposure to air and moisture.

Another object is the provision of a cover of the foregoing character wherein protection of the welding wire from air and moisture is enhanced by sealing material between the cover and the flanges of the reel.

A further object is the provision of a cover of the foregoing character which is adapted to remain on a reel of welding wire during unwinding of the wire therefrom and feeding of the wire to a welding station.

Yet a further object is the provision of a cover of the foregoing character wherein the wire extends through an opening in the cover and is supported thereby during feeding of the wire to a welding station while maintaining sealing of the interior of the cover from the ingress of moisture and air.

Still another object is the provision of a cover of the foregoing character wherein the retraction of the free end of the welding wire through the opening and into the cover is restrained by a sealing arrangement at the opening and/or is precluded by a one-way interengagement arrangement between the reel and cover.

A further object is the provision of a cover of the foregoing character comprised of snap-locked cover portions which together completely enclose and seal a reel of welding wire and facilitate the transportation, storage and use of the reel.

Still a further object is the provision of covers of the foregoing character which are structurally simple, reusable, easy to apply and remove from a welding wire reel and which, when applied thereto, optimize protection of the welding wire on the reel from exposure to air and moisture.

BRIEF DESCRIPTION OF THE DRAWINGS

The foregoing objects, and others, will in part be obvious and in part pointed out more fully hereinafter in conjunction with the written description of preferred embodiments of the invention illustrated in the accompanying drawings in which.

DESCRIPTION OF PREFERRED EMBODIMENTS

Figure 1:
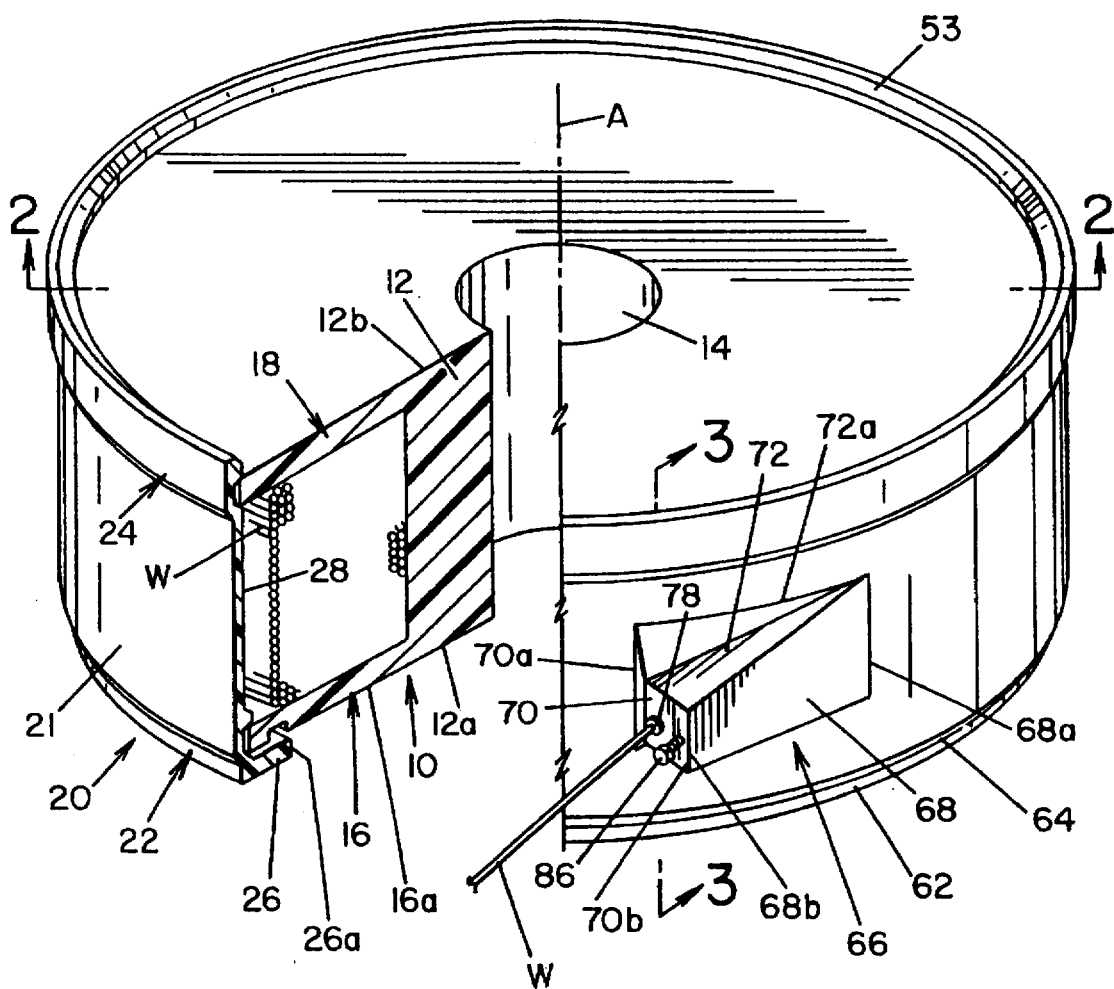
FIG. 1 is perspective view, partially in section, of a flanged welding wire reel provided with a cover in accordance with the present invention.
Figure 2:
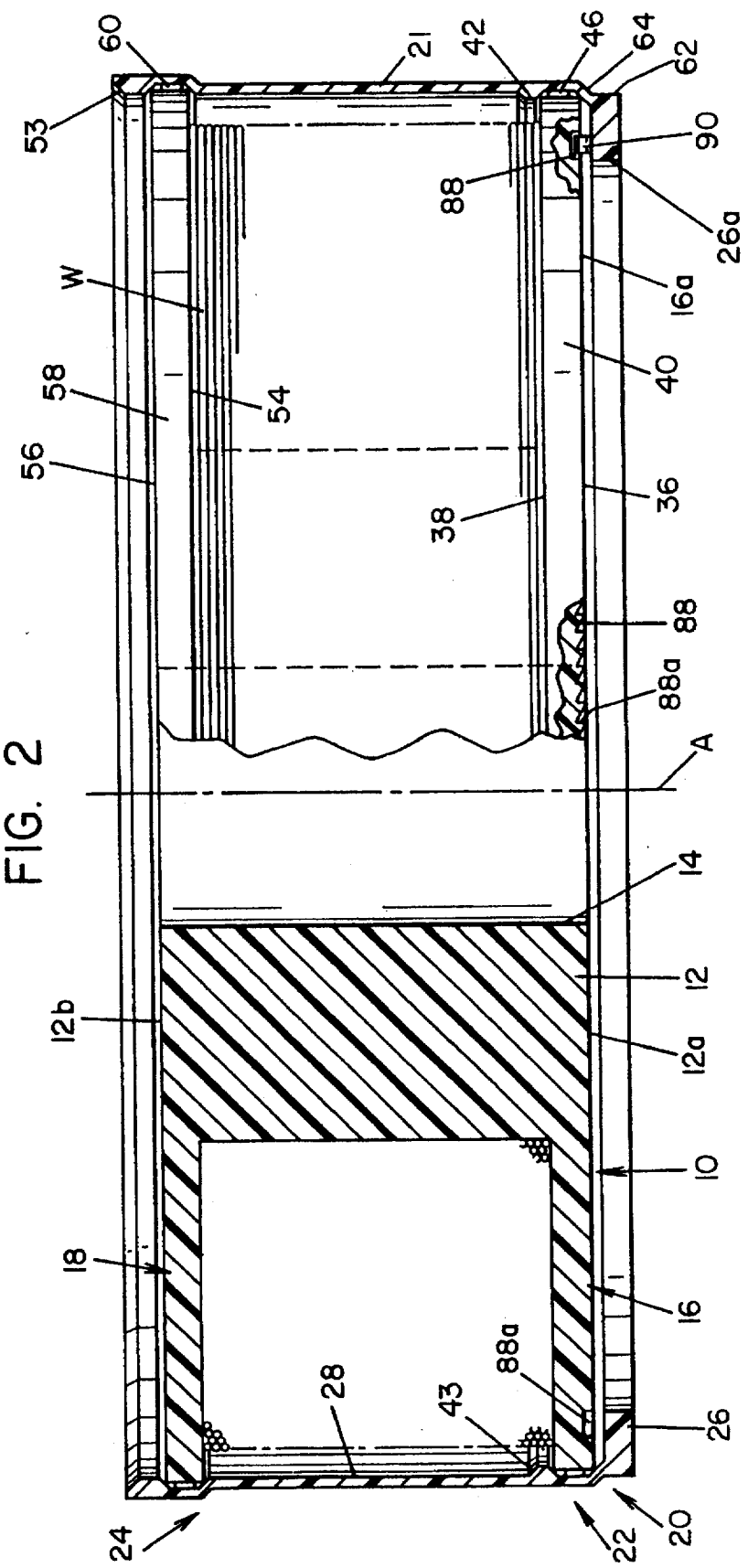
FIG. 2 is an enlarged sectional elevation view of the reel and cover taken along line 2—2 in FIG. 1.
Figure 3:
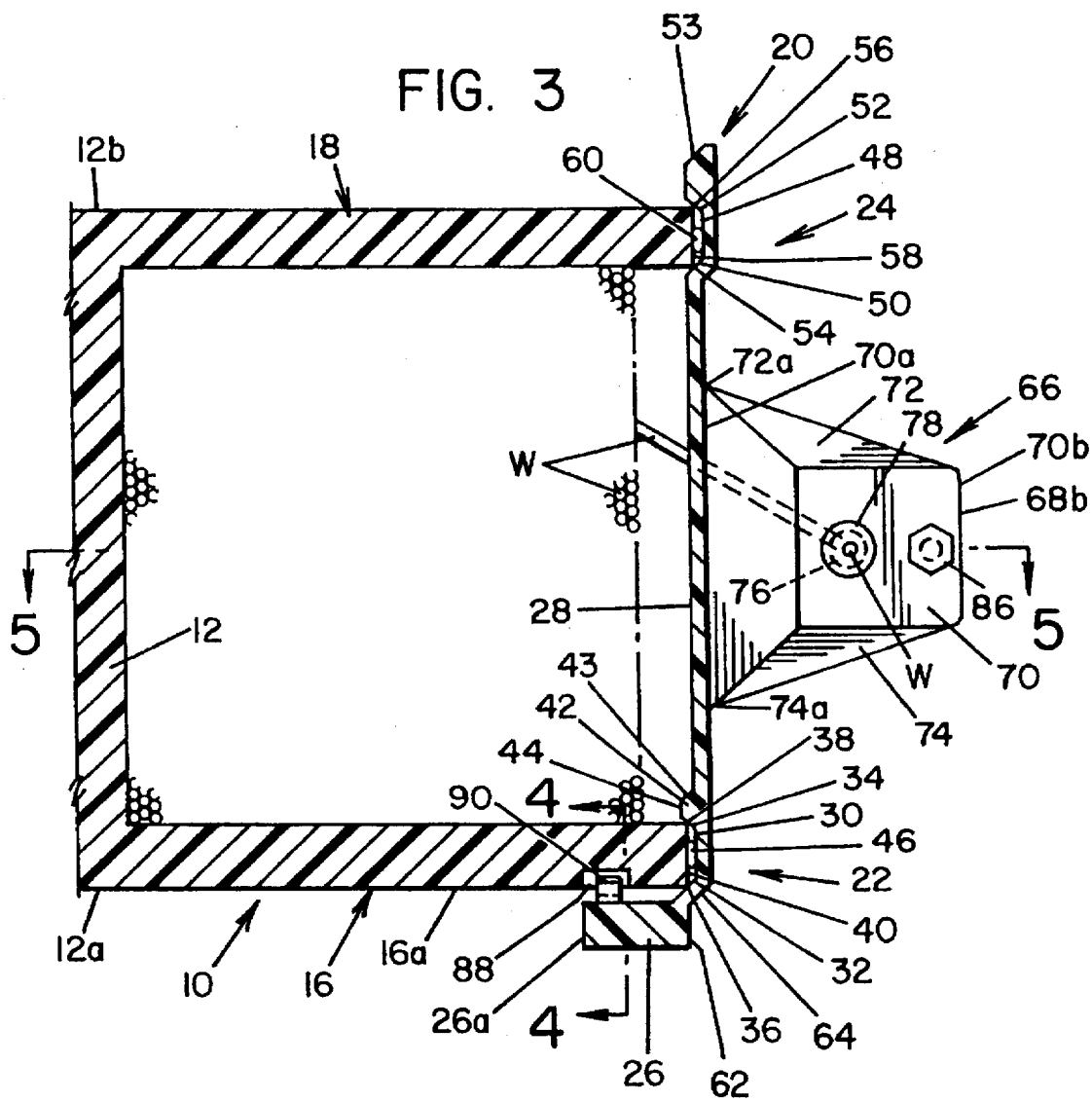
FIG. 3 is an enlarged elevation view, partially in section, taken along line 3—3 in FIG. 1 and showing an integral nose on the cover and a one-way rotation arrangement between the reel and cover.

Referring now in greater detail to the drawings wherein the showings are for the purpose of illustrating preferred embodiments of the invention only, and not for the purpose of limiting the invention, FIGS. 1–3 illustrate a reel 10, preferably of nylon material, on which electric arc welding electrode wire W is wound and which reel comprises a circular hub 12 having a bore 14 therethrough providing a reel axis A. Reel 10 further includes first and second axially spaced apart flanges 16 and 18, respectively extending radially outwardly from hub 12 at the axially opposite first and second ends 12a and 12b thereof.

In accordance with the present invention, a cover 20 which is in the form of a sleeve of suitable material such as nylon extends about the outer peripheries of flanges 16 and 18 so as to cover the space therebetween and thus protect wire W from exposure to moisture and air. Cover 20 is coaxial with axis A and is in the form of a cylindrical sleeve having axially opposite first and second ends which respectively include first and second end portions 22 and 24 extending axially across the outer peripheries of flanges 16 and 18. Cover 20 further includes an end wall 26 extending radially inwardly from first end portion 22 and which end wall is axially outwardly adjacent the axially outer surface 16a of reel flange 16 and includes a radially inner peripheral edge 26a.

The inner side of cover 20 includes cylindrical inner surface 28, and end portions 22 and 24 are provided on the inner side of the cover with retaining and sealing arrangements respectively interengaging with flanges 16 and 18 to releasably retain cover 20 on reel 10 and seal the space between flanges 16 and 18 from the ingress of air and moisture across the outer peripheries of the flanges. More particularly, as best seen in FIG. 3, the inner side of first end portion 22 includes a radially inwardly open circumferentially extending recess having a bottom wall 30 and axially spaced apart side walls 32 and 34 which extend radially inwardly from bottom wall 30 in diverging relationship relative to one another. The radially outer periphery of flange 16 includes axially spaced apart peripheral edges 36 and 38 respectively engaging recess walls 32 and 34, and an axially extending peripheral surface 40 between edges 36 and 38 and which is parallel to and spaced radially inwardly from bottom 30 of the recess. Bottom wall 30 is of the same diameter as inner surface 28, and side wall 34 of the recess is provided by a projection 42 extending radially inwardly from and circumferentially about inner surface 28 of the cover. Projection 42 has an upper side wall 43 which tapers downwardly and inwardly for the purpose set forth hereinafter, and the recess has a radially inner end defined by radially inner side 44 of projection 42. The engagement between flange edges 36 and 38 and the corresponding side walls of the recess seals the space across the outer periphery of flange 16 and, preferably, such sealing is enhanced by providing an O-ring 46 of rubber or other suitable elastomeric material in the recess between bottom wall 30 thereof and outer peripheral surface 40 of flange 16.

The radially inner side of second end portion 24 of cover 20 is provided with a radially inwardly open circumferentially extending recess including a bottom wall 48 and axially spaced apart side walls 50 and 52 extending radially inwardly from bottom wall 48 in axially diverging relationship relative to one another. Bottom wall 48 is spaced radially outwardly from cylindrical inner surface 28, and side walls 50 and 52 intersect surface 28 to provide the recess with a radially inner end at the latter surface. The inner side of the upper end of second end portion 24 is provided with a peripheral edge 53 which tapers downwardly and inwardly for the purpose set forth hereinafter. The outer periphery of flange 18 includes axially spaced apart peripheral edges 54 and 56 and an axially extending peripheral surface 58 therebetween, and edges 54 and 56 engage the corresponding side walls of the recess to close the space across the outer periphery of flange 18. Preferably, such sealing is enhanced by an O-ring 60 of rubber or other suitable elastomeric material in the recess between bottom wall 48 thereof and peripheral surface 58 of the flange.

In this embodiment, outer peripheral surface 40 of first flange 16 provides the latter with a first outer diameter, outer peripheral surface 58 of second flange 18 provides the latter with a second outer diameter, and cylindrical inner surface 28 of cover 20 has a third diameter which, as will be appreciated from FIGS. 1–3 and the foregoing description thereof, is greater than the first diameter and less than the second diameter. Further, bottom wall 30 of the recess in first end portion 22 has a diameter greater than the first diameter, and the recess has a radially inner end having a diameter less than the first diameter. Still further, bottom wall 48 of the recess in second end portion 24 has a diameter greater than the second diameter and the recess has a radially inner end having a diameter equal to the third diameter. The foregoing relationships between the diameters of the flanges, recesses and inner surface of the cover provide for a reel and cover to be axially interengaged by introducing flange 16 of the reel axially into the cover in the direction from the second end toward the first end thereof. During such interengaging movement, flange 16 will move freely through the cover toward second end portion 22 thereof until lower edge 36 of flange 16 engages surface 43 of projection 42 and lower edge 54 of flange 18 engages surface 53 at the upper end of the cover. Upon further axial displacement of the reel toward the first end of the cover, edge 36 of flange 16 cams first end portion 22 radially outwardly and edge 54 of flange 18 cams second end portion 24 radially outwardly, after which flanges 16 and 18 move into alignment with and are received in the corresponding one of the recesses to snap-lock the reel and cover in assembled relationship. Such assembly can be achieved by positioning the cover with end wall 26 on an underlying support surface and dropping reel 10 vertically downwardly thereinto, and the cover can be removed by reorienting the covered reel for the end wall to be at the top relative to the underlying support surface and then pushing downwardly on the reel through opening 26a in the end wall.

Preferably, as will best be appreciated from FIG. 2, first end portion 22 of the cover is necked-in to provide end wall 26 with an axially extending outer peripheral surface 62 and a tapered edge 64. Surface 62 has an outer diameter less than the inner diameter of cylindrical wall 28 and the taper of edge 64 corresponds to the taper of inner edge 53 of second end portion 24. The axial dimension of surface 62 and the taper of edge 64 provide for the first end portion of one covered reel to be received in the second end portion of a second covered reel therebeneath with end wall 26 of the first covered reel resting on second flange 18 of the second covered reel. This advantageously enables vertically stacking two or more covered reels in an interengaged relationship which precludes relative lateral displacement therebetween.

Figure 5:
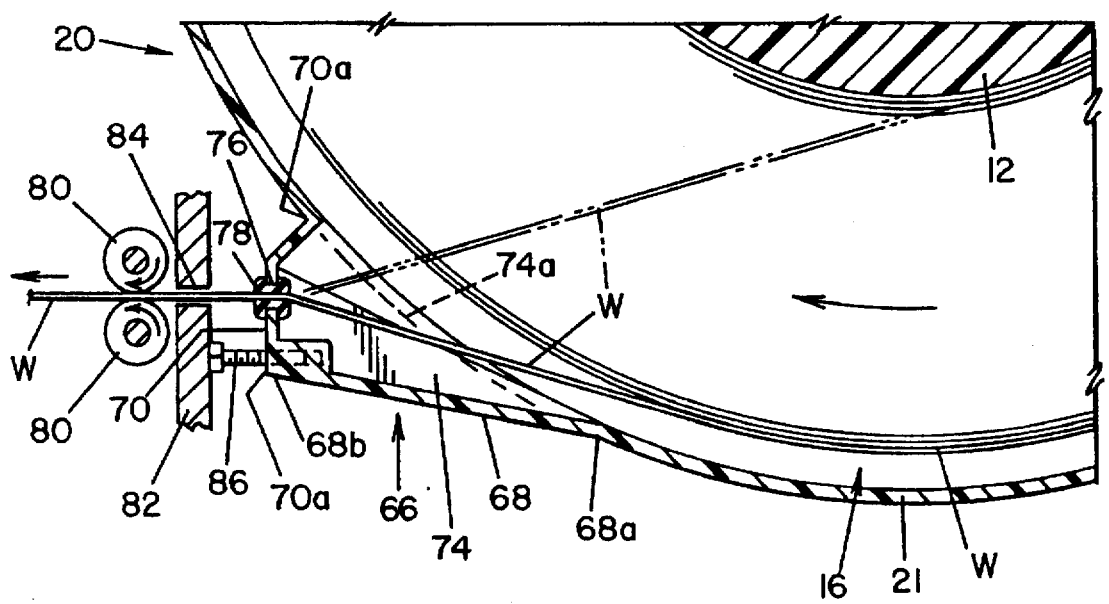
FIG. 5 is a plan view in section of the nose, taken along line 5—5 in FIG. 3, and schematically illustrating the feeding of welding wire from the reel.

It will be appreciated that the cover as thus far described is capable of providing the desired protection for welding wire W wound on a reel to which the cover is applied. Such protection would be afforded during transportation and storage of the covered reel and, for use, the cover would be removed as described above and the reel of wire mounted on the welding apparatus for feeding the wire to the welding station. In accordance with another aspect of the invention, however, it is possible to maintain the cover on the reel during use, thus to extend protection of the wire from exposure to undesirable ambient conditions to the period of use thereof in the welding system. More particularly in this respect, and as further illustrated in FIGS. 1, 3 and 5 of the drawing, sleeve 21 of the cover can be provided with a nose 66 for guiding and supporting the feeding of wire W from reel 10 to the welding station. Nose 66 in this embodiment is integral with sleeve 21 and includes a first nose wall 68 having a first end 68a at sleeve 21 and a second end 68b radially spaced from sleeve 21 and circumferentially spaced from end 68a. Nose 66 further includes a second nose wall 70 having a first end 70a at sleeve 21 and a second end 70b integral with second end 68b of wall 68. In the orientation of the reel cover shown in FIGS. 1, 3 and 5, nose 66 further includes an upper wall 72 having an inner end 72a at sleeve 21 and an outer end connected to the upper ends of walls 68 and 70, and a lower wall 74 having an inner end 74a at sleeve 21 and an outer end connected to the lower ends of walls 68 and 70. As best seen in FIG. 5, second wall 70 is provided with an opening 76 for feeding wire W through the cover from reel 10 and, preferably, opening 76 is sealed by means of a grommet 78 of rubber or the like through which wire W extends. Grommet 78 not only seals the opening against the ingress of ambient air into the cover but also frictionally engages wire W to restrain retraction thereof into the cover. Cover 20 and reel 10 are relatively rotatable to provide for the wire to be played from the reel during use and, as is well known and shown somewhat schematically in FIG. 5, wire W is fed from the reel by a pair of driven feed rolls 80 of the welding apparatus. Any suitable arrangement can be provided for precluding rotation of cover 20 relative to the reel during the unwinding of wire therefrom, and in the embodiment illustrated, a stop plate 82 having an opening 84 therethrough for wire W is fixed on the welding apparatus adjacent cover 20 and nose 66 is provided with an adjustable abutment screw 86 having a headed end engaging against plate 82 to hold cover 20 against rotation in response to the pulling of wire W by drive rolls 80. When wire W is initially wound on reel 10 and cover 20 is applied thereto, the free end of wire W can be pushed outwardly through grommet 78 and bent to extend transverse to the axis of opening 76, thus to preclude retraction of the wire into the cover during transportation and storage of the covered reel.

Figure 4:
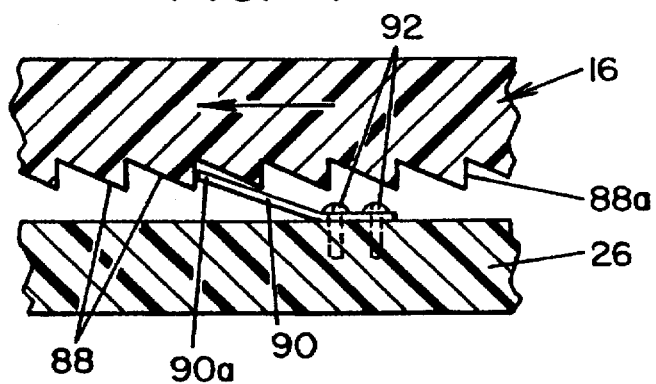
FIG. 4 is a detailed sectional elevation view of the one-way rotation arrangement taken along line 4—4 in FIG. 3.

A further possible modification of the basic cover as described hereinabove is illustrated in FIGS. 2–4 of the drawing, and this modification provides a one-way interengaging arrangement between the reel and cover to positively preclude rotation of the reel relative to the cover in the direction which would retract the wire onto the reel. More particularly in this respect, the axially outer side 16a of flange 16 of reel 10 is provided adjacent the radially outer periphery thereof with ratchet teeth 88 which extend completely thereabout coaxial with axis A. The axially inner side of end wall 26 of cover 20 is provided with a pawl 90 of suitable resilient material secured to end wall 26 such as by threaded fasteners 92. Pawl 90 is adapted to be axially displaced against the resilient bias thereof in response to displacement of reel flange 16 from right to left in FIG. 4 and to engage against end faces 88a of ratchet teeth 88 to preclude rotation of flange 16 and thus wire reel 10 in the direction from left to right. As will be appreciated from FIGS. 1 and 3, the ratchet and pawl arrangement permits clockwise rotation of reel 10 relative to cover 20 which is the unwinding direction with respect to wire W on the reel, and precludes counterclockwise rotation of the reel relative to the cover and thus precludes retraction of wire W into the cover.

Figure 6:
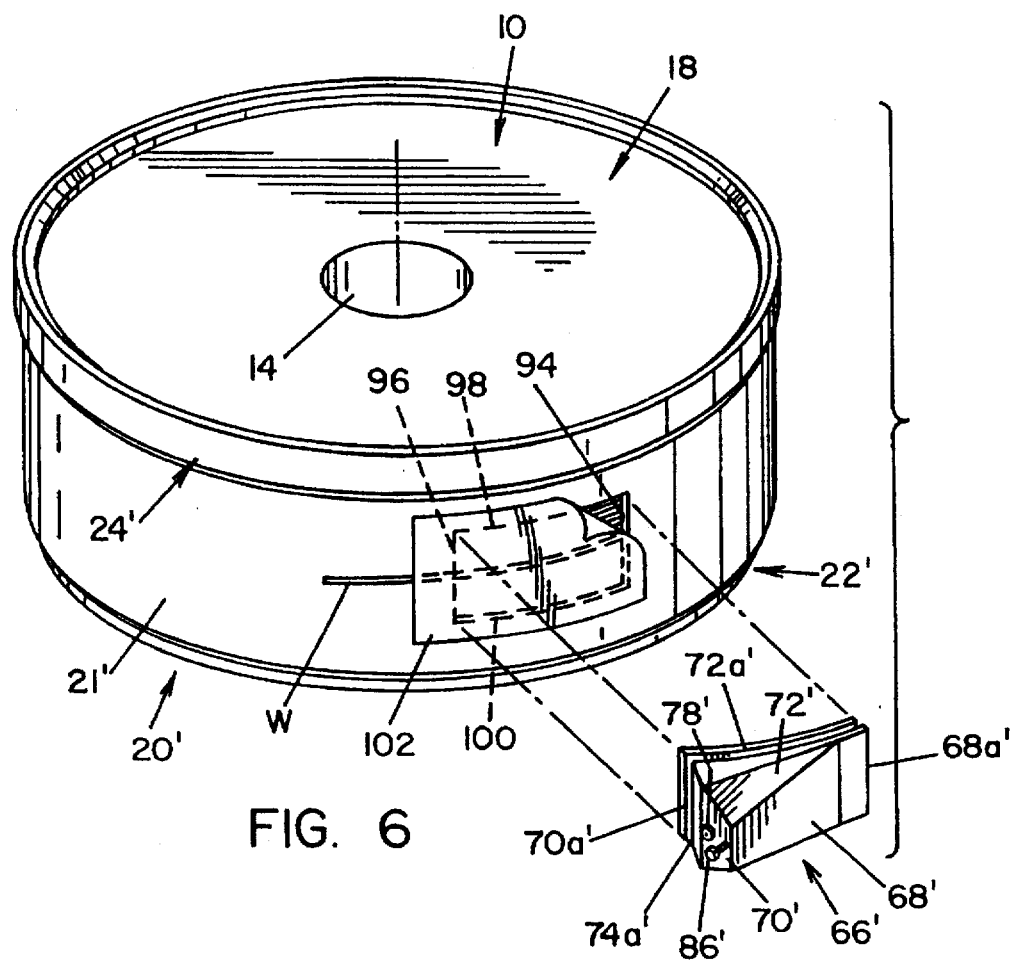
FIG. 6 is a perspective view of a cover and a detachable nose thereon.
Figure 8:
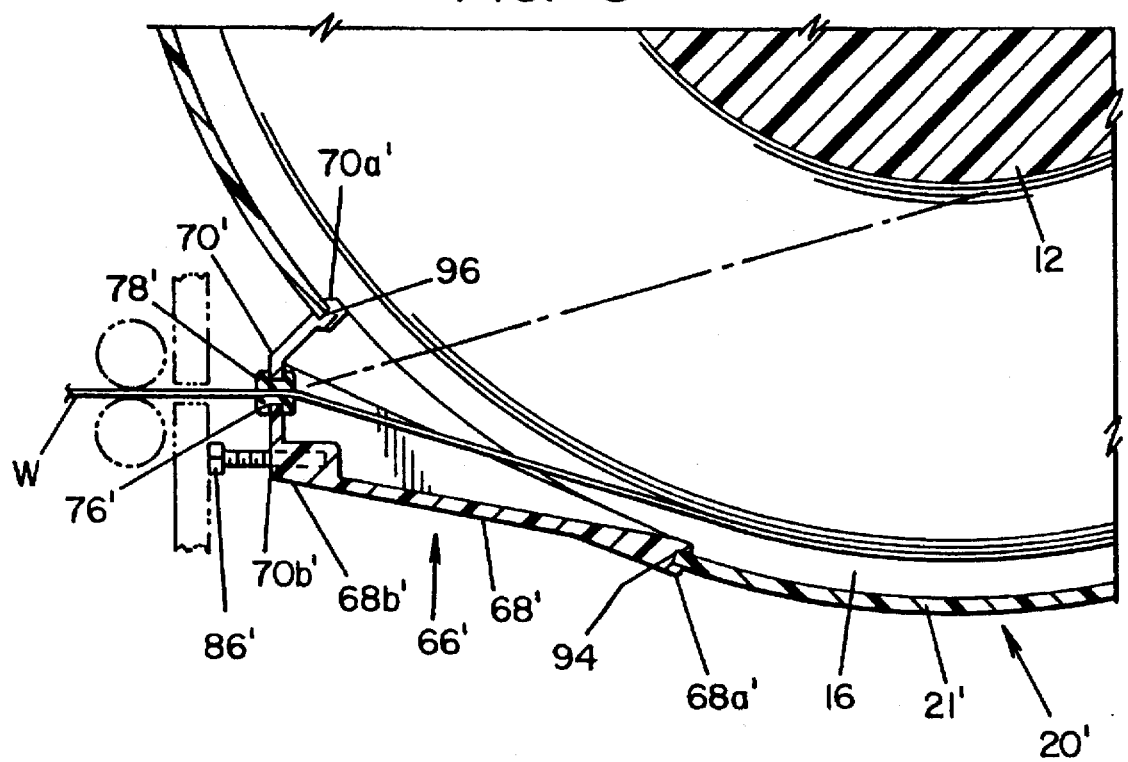
FIG. 8 is a plan view in section of the detachable nose, taken along line 8—8 in FIG. 7.
Figure 7:
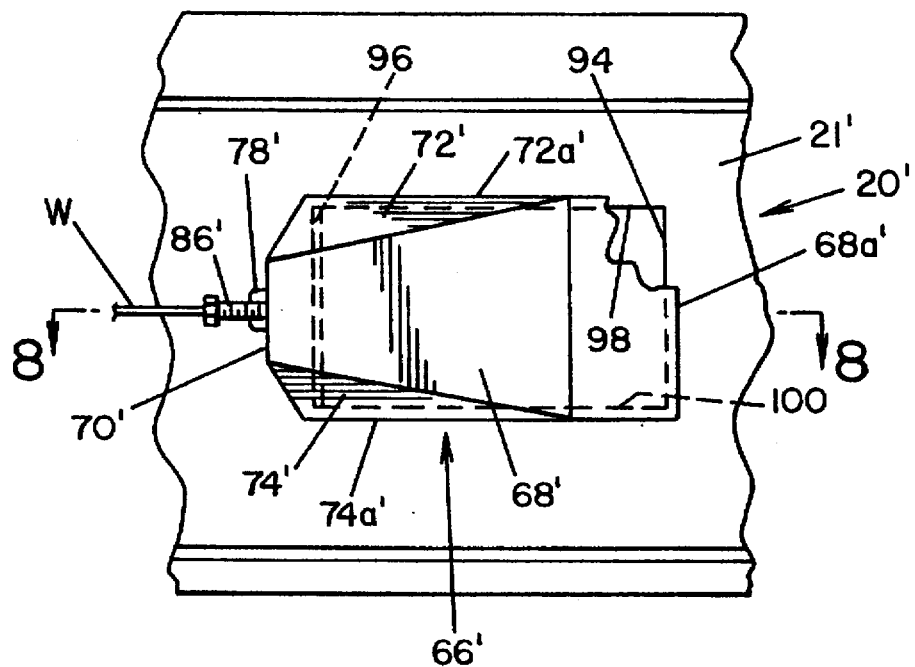
FIG. 7 is an elevation view of the detachable nose on the cover.

FIGS. 6–8 illustrate a modification of the nose feature described hereinabove and by which the nose member, designated by the numeral 66' in the latter figures, is separate from and detachably mounted on the cover sleeve. The nose structure as well as that of the cover is basically the same as described hereinabove, whereby like numerals with primes are employed in FIGS. 6–8 to designate corresponding parts. In this embodiment, sleeve 21' of cover 20' is provided with a rectangular opening therethrough having circumferentially spaced apart end edges 94 and 96 and axially spaced apart upper and lower edges 98 and 100, respectively. When cover 20' is applied to the reel for shipping and storage purposes the opening can be covered such as by a strip of tape 102 adhesively secured to the outer surface of sleeve 21', and the free end of wire W can be suitably secured against unwinding displacement relative to the reel such as by bringing the free end of the wire through the opening and securing the free end against sleeve 21' by means of tape 102. The inner ends 68a', 70a', 72a' and 74a' of nose member 66' are provided with corresponding recesses, not designated numerically, which receive the corresponding one of the opening edges 94, 96, 98 and 100 therein to releasably secure nose member 66' in the opening. Nose member 66' is constructed from a suitable material such as nylon for the nose walls to have the flexibility necessary for achieving mounting and removal of the nose member relative to the cover sleeve.

Figure 9:
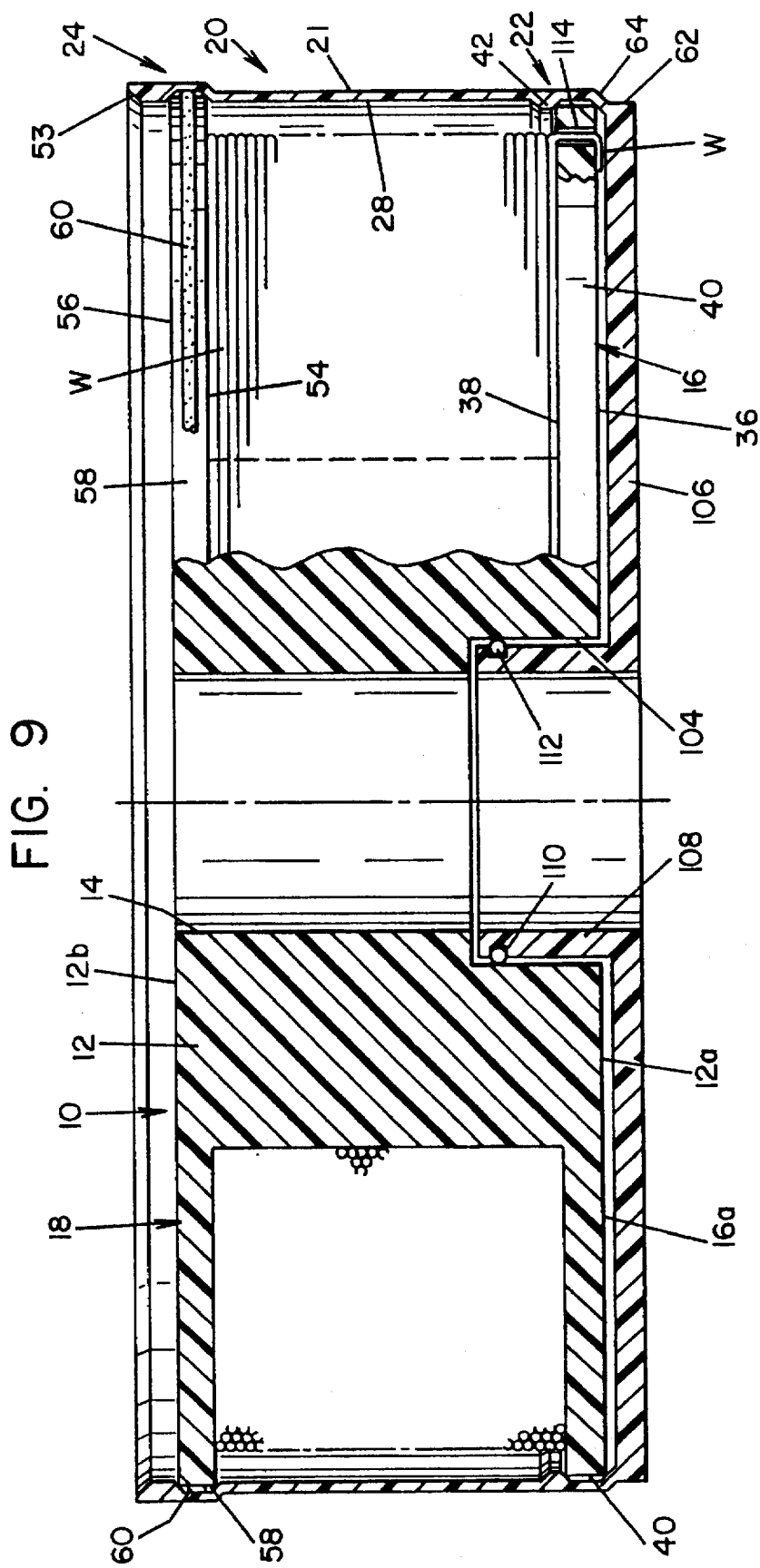
FIG. 9 is a cross-sectional elevation view of another embodiment of the cover in accordance with the present invention.

It is sometimes desirable, in connection with shipping and storage of a covered welding wire reel, to extend the free end of wire W through an axial opening through one of the reel flanges 16 and to bend the wire against the outer side of the flange so as to preclude unwinding of the wire during shipping and/or storage. As will be appreciated from the embodiments described hereinabove, an opening through flange 16, for example, would provide a passageway for the ingress of air and moisture between the flanges if the end wall was of the structure of end wall 26 in the previous embodiments. In this respect, such an opening would provide a bypass with respect to the sealed outer periphery of flange 16. FIG. 9 illustrates a modification of the basic cover described hereinabove, for avoiding the latter problem, and in FIG. 9 like numerals are used to designate corresponding parts of the cover and reel. In this embodiment, bore 14 through hub 12 of reel 10 is provided with a counterbore 104 extending axially inwardly from axially outer side 12a thereof, and end wall 26 of cover 20 is replaced by an end wall 106 which extends radially inwardly across axially outer sides 16a of flange 16 and 12a of hub 12 to counterbore 104. The radially inner end of end wall 106 is provided with a circular sleeve 108 which extends axially inwardly of counterbore 104 and is provided adjacent its axially inner end with a circumferential recess 110 receiving an O-ring seal 112 which sealingly engages the inner surface of counterbore 104. Flange 16 is provided with an opening 114 therethrough and through which the free end of wire W extends, and end wall 106, sleeve 108 and seal 112 preclude opening 114 providing a bypass for the ingress of air and moisture between flanges 16 and 18 and thus, together with the sealed outer periphery of flange 18, seal the space between the flanges to protect wire W. Furthermore, with this arrangement it is not necessary to provide sealing member 46 between the recess in first end portion 22 of the cover and the outer periphery of flange 16.

FIGS. 10–13 illustrate yet another embodiment of a welding wire reel cover in accordance with the present invention. In this embodiment, the cover which is designated generally by the numeral 116 completely encloses reel 10 and is comprised of first and second cover portions 118 and 120, respectively, which are snap-locked together as described more fully hereinafter. When assembled, the cover portions provide cover 116 with a tubular inner wall 122 extending through bore 14 of reel 10 and having axially opposite first and second ends 122a and 122b, respectively, an outer wall 124 extending about the outer peripheries of reel flanges 16 and 18 and having axially opposite first and second ends 124a and 124b, respectively, a first end wall 126 axially outwardly adjacent flange 16 and having radially inner and outer ends respectively integral with first ends 122a and 124a of inner and outer walls 122 and 124, and a second end wall 128 axially outwardly adjacent flange 18 and having radially inner and outer ends respectively integral with second ends 122b and 124b of inner and outer walls 122 and 124.

Figure 11:
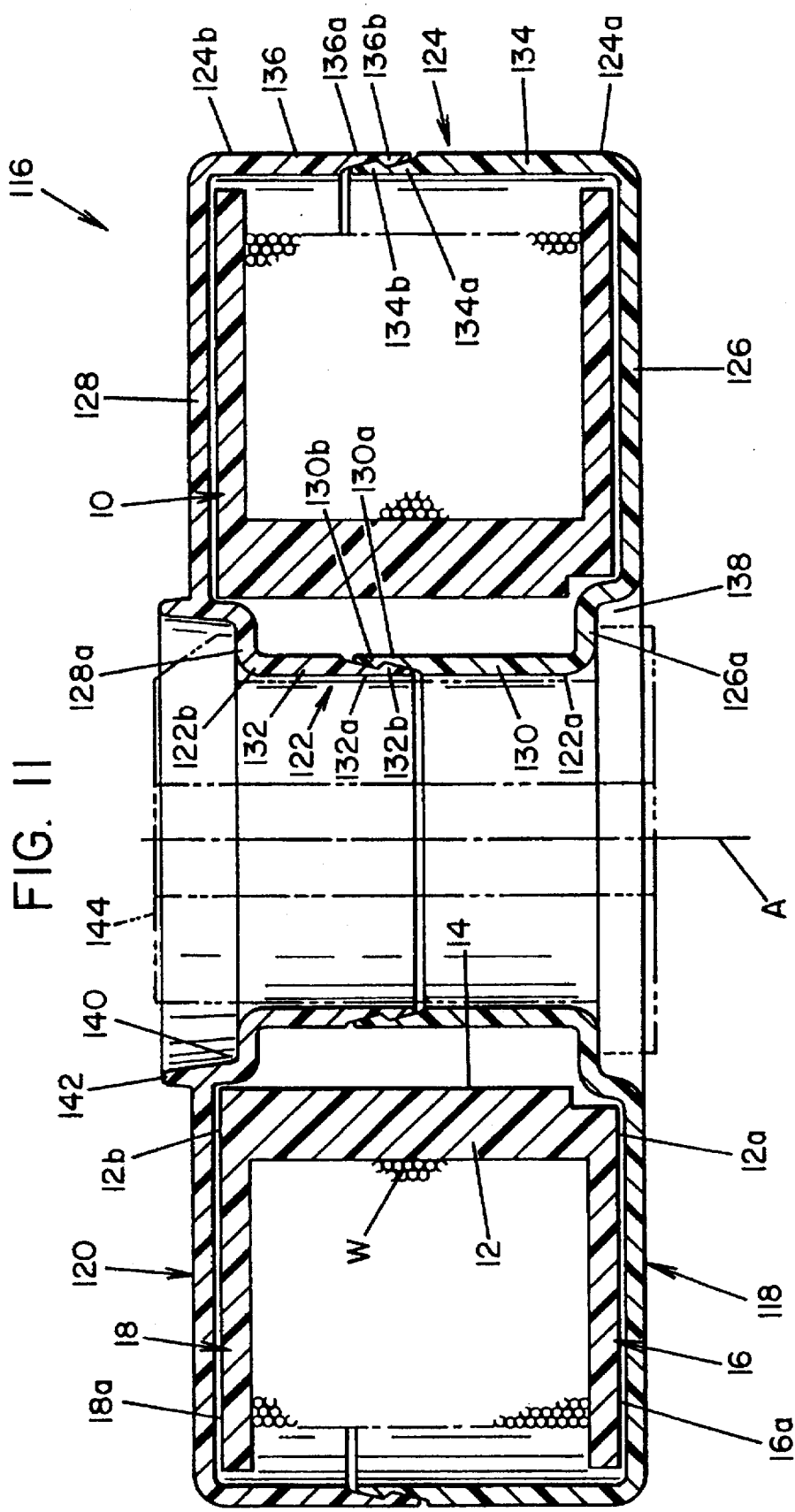
FIG. 11 is a cross-sectional elevation view of the cover and reel taken along line 11—11 in FIG. 10.

Inner wall 122 of the cover is comprised of first and second inner wall portions 130 and 132 respectively extending axially inwardly from end wall 126 and end wall 128 and having corresponding axially inner ends 130a and 132a. Inner ends 130a and 132a axially overlap and are provided with corresponding circumferentially extending serrations 130b and 132b which are adapted to axially interengage to snaplock inner wall portions 130 and 132 together. Outer wall 124 of the cover is similarly comprised of first and second outer wall portions 134 and 136 respectively extending axially inwardly from end walls 126 and 128 and having axially inner ends 134a and 136a, respectively. Ends 134a and 136a axially overlap and are provided with corresponding circumferentially extending serrations 134b and 136b which are adapted to axially interengage to snap-lock outer wall portions 134 and 136 together. Accordingly, it will be appreciated that first cover portion 118 is defined by inner wall portion 130, end wall 126 and outer wall portion 134, and that second cover portion 120 is defined by inner wall portion 132, end wall 128 and outer wall portion 136. It will be further appreciated that when cover portions 118 and 120 are snap-locked together as shown in FIG. 11, the cover completely encloses welding wire reel 10 and that the interengaging serrations between the first and second cover portions seal the interior thereof against the ingress of air and moisture, and thus seal the space between flanges 16 and 18 to protect wire W wound on the reel.

Further in accordance with this embodiment, the radially inner end 126a of first end wall 126 is contoured to provide a circular recess 138 extending axially inwardly from the axially outer side of wall 126, and the radially inner end 128a of second end wall 128 is contoured to provide a circular recess 140 extending axially inwardly of the axially outer side of wall 128 and having an outer end defined by a circular projection 142 extending axially outwardly of the axially outer side of wall 128. Projection 142 is of a diameter less than that of recess 138 whereby, with respect to the orientation of the cover shown in FIG. 11, a second covered reel is adapted to be stacked vertically above the covered reel shown with the projection 142 of the lower covered reel received in recess 138 of the upper covered reel. Such axial interengagement provides for end wall 126 of the upper covered reel to rest on end wall 128 of the lower covered reel, and projection 142 and recess 138 interengage to preclude relative lateral displacement between the covered reels. Recesses 138 and 140 also provide for the cover to receive a mandrel 144 as schematically shown in FIG. 11 and by which the covered reel is mountable at the wire supply station of welding apparatus.

Figure 10:
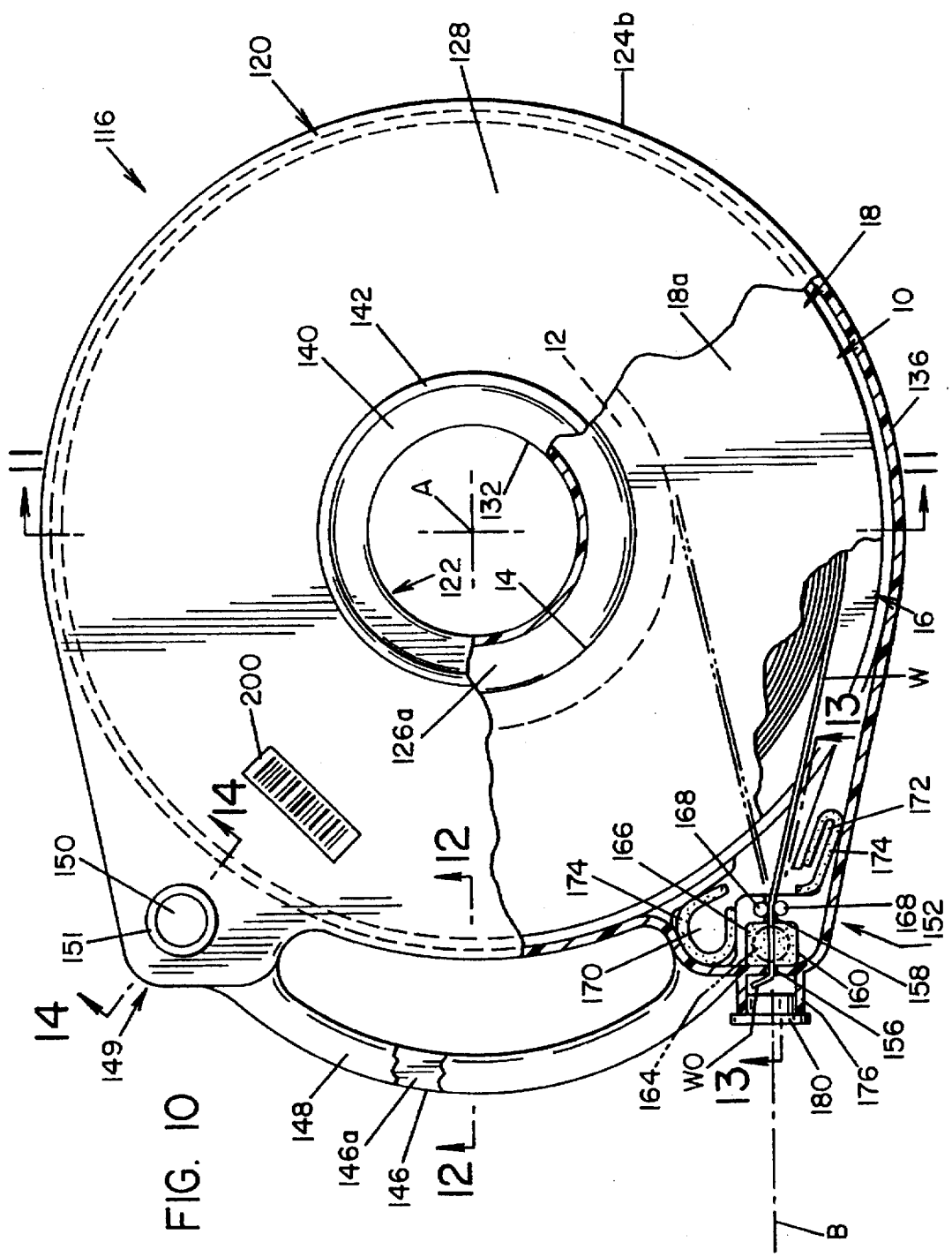
FIG. 10 is a plan view, partially in section, of a further embodiment of a cover in accordance with the present invention.
Figure 12:
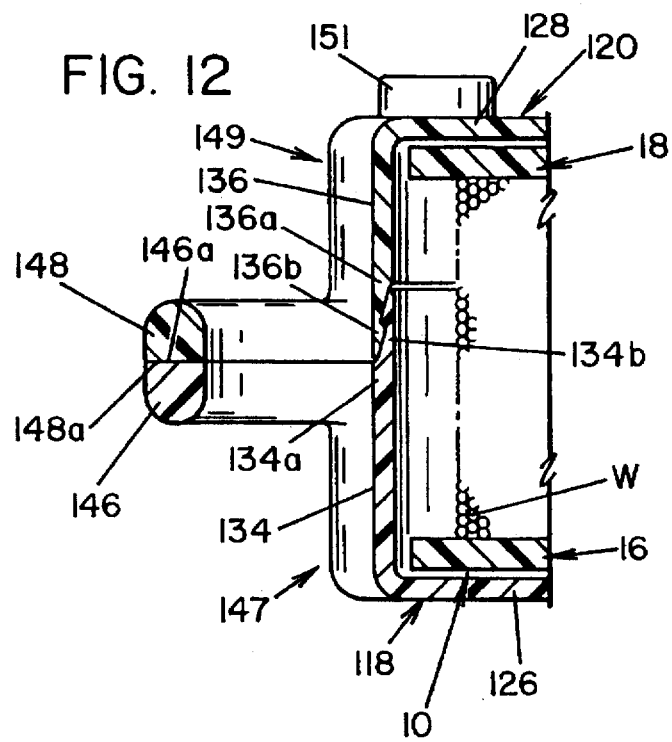
FIG. 12 is a sectional elevation view through the handle of the cover, taken along line 12—12 in FIG. 10.
Figure 14:
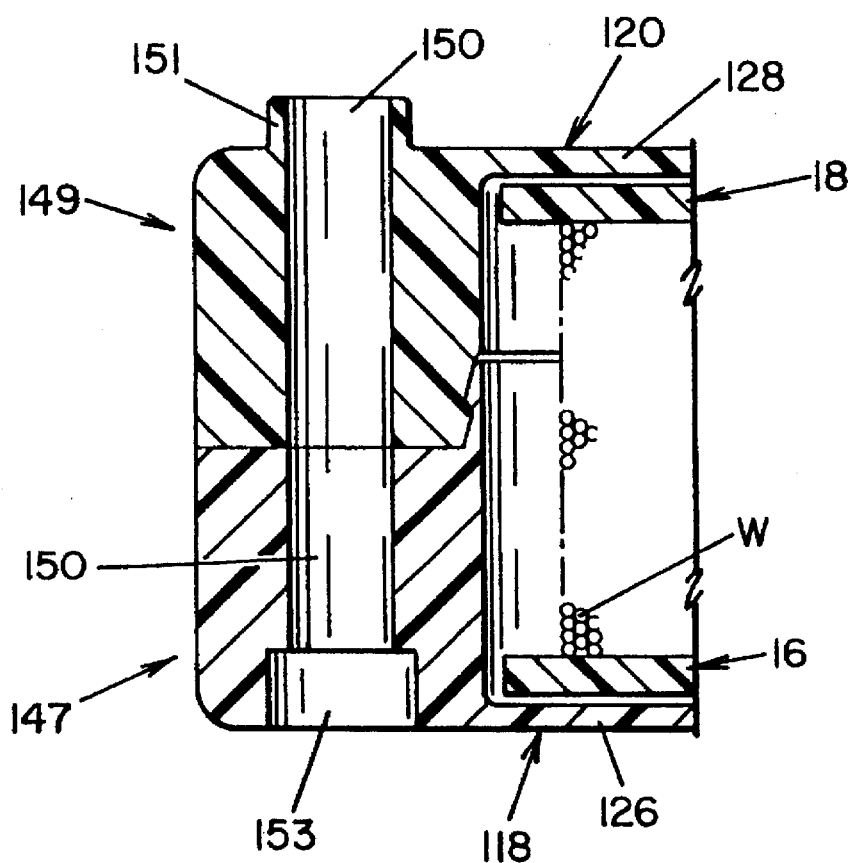
FIG. 14 is a detail sectional elevation view taken along line 14—14 in FIG. 10.

As best seen in FIGS. 10 and 12, first cover portion 118 includes a first handle portion 146 radially outwardly of outer wall portion 134 thereof, and second cover portion 120 includes a second handle portion 148 radially outwardly of outer wall portion 136 thereof. Handle portions 146 and 148 are of mating contour and have facially engaging axially inner sides 146a and 148a, respectively, when the cover portions are assembled. Further, as will be appreciated from FIGS. 10, 12 and 14, cover portions 118 and 120 have portions 147 and 149 respectively extending outwardly of walls 134 and 136 at one end of handle portions 146 and 148 and with which the ends of the handle portions are respectively integral. Each of the portions 147 and 149 includes an opening 150 extending axially therethrough, shown in FIGURE 14, and openings 150 are aligned with one another when the cover portions are assembled. Preferably, the opening 150 through portion 149 is surrounded by a tubular wall 151 which extends axially outwardly from side 128 of cover portion 120, and the opening 150 through portion 147 includes a circular recess 153 extending axially inwardly from side 126 of cover portion 118. Recess 153 is adapted to receive wall 151 of an adjacent cover when stacked vertically relative thereto. Such interengagement precludes relative rotation between the stacked covered reels. Handle portions 146 and 148 together provide a handle which facilitates carrying a covered welding wire reel, and openings 150 through the handle portions can be used, for example and in addition to the above purpose, to hang the covered reel and to receive a pin or the like at the wire supply station of welding apparatus to preclude rotation of the cover as wire is unwound from the reel and fed to the welding station.

Figure 13:
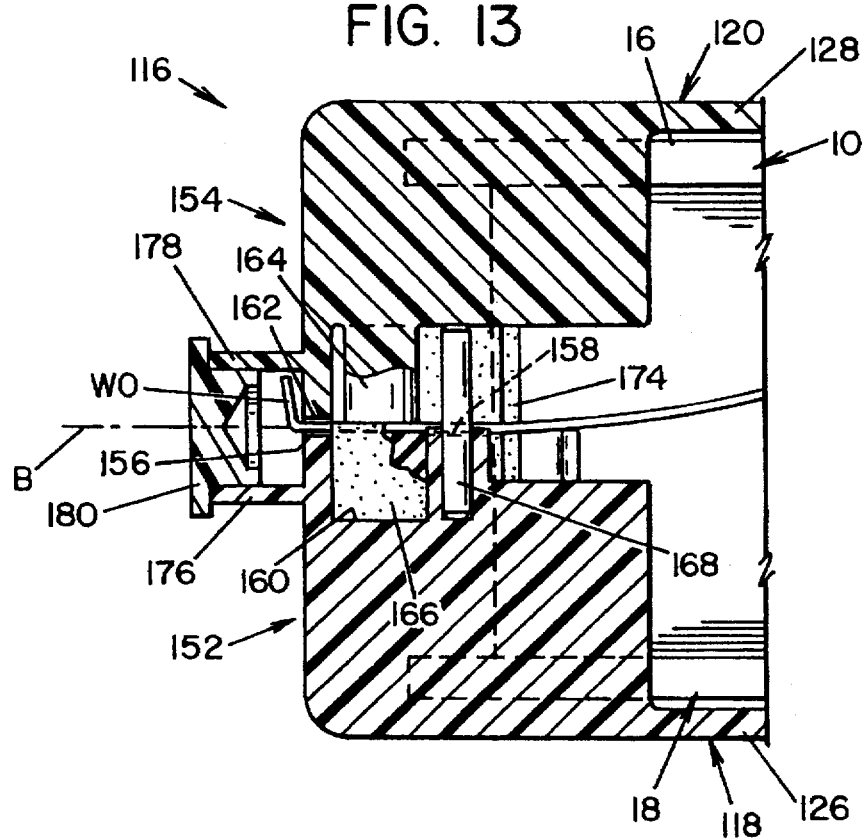
FIG. 13 is a detail sectional elevation view through the nose of the cover, taken along line 13—13 in FIG. 10.

As will be further appreciated from FIGS. 10 and 13 of the drawing, first cover portion 118 includes a first nose portion 152 and second cover portion 120 includes a second nose portion 154, each of which nose portions is circumferentially adjacent the other end of the corresponding handle portion and integral therewith. Further, nose portion 152 and 154 have axially inner sides which are in opposed relationship when the cover portions are assembled. The inner side of nose portion 152 is provided with semi-circular recesses 156 and 158 and with a rectangular recess 160 therebetween. The inner side of nose portion 154 is provided with a semi-circular recess 162 opposite recess 156 and with a circular post 164 opposite recess 160. Opposed recesses 156 and 162 together provide a circular opening through the nose portions having an axis B extending generally tangentially with respect to reel 10 and through which the free end of wire W extends from the reel.

Recess 160 receives a sealing member 166 of rubber or the like and into which wire W is pressed by the inner end of post 164. In this respect, sealing member 166 is of a thickness slightly greater than the depth of recess 160 whereby, when the cover portions are disassembled, the outer side of the seal member is spaced outwardly from the inner side of nose portion 152. This provides for the seal member to be compressed by post 164 when the cover portions are assembled, thus to press the wire thereagainst to seal against the ingress of air and moisture into the cover. Further, the post and sealing member exert a force on the wire and the rubber sealing member acts as a built in drag brake which restrains free displacement of the wire through the opening. This advantageously maintains the same tension on the wire constantly during use and restrains undesired retraction of the wire through the opening and into the cover. The inner side of nose 152 is also provided with bores, not designated numerically, for receiving positioning pins 168 which are parallel to hub axis A and spaced apart transverse to axis B so as to be adjacent diametrically opposite sides of wire opening recess 158. Pins 168 advantageously position wire W relative to the wire opening and preclude the wire from moving between the inner sides of the nose portions during unwinding of the wire from the reel. The inner sides of nose portions 152 and 154 are further provided with recessed areas 170 and 172, as shown in connection with nose portion 152 in FIG. 10, and these recesses are in opposed alignment when the cover portions are assembled and together provide pocket areas for receiving a suitable moisture absorbing material 174 which, for example, could be one or more bags of granular desiccant. Such moisture absorbing material serves to keep the interior of the cover dry so as to optimize the protection for wire W. Prior to use, the free end of wire W can be introduced through the wire opening and the outer end WO of the wire bent transverse to axis B as shown in FIGS. 10 and 13 so as to assure against retraction of the wire into the cover. Preferably, the outer ends of nose portions 152 and 154 are provided with semi-circular walls 176 and 178, respectively, which together provide an annular wall coaxial with axis B and extending axially outwardly from the wire opening. The annular wall receives a removable plug 180 which advantageously further seals against the ingress of air and moisture into the cover and protects wire end WO during storage. Plug 180 frictionally engages in the opening therefor but, alternatively, can be threadedly or otherwise removably interengaged therewith. As will be appreciated from the foregoing description, the sealingly interengaging serrations on the inner and outer wall portions of the cover members together with the sealing arrangement at the wire opening through the nose portions of the cover members advantageously provide a double seal to assure against ingress of air and moisture into the cover during shipment and storage of the spool of wire.

Figure 15:
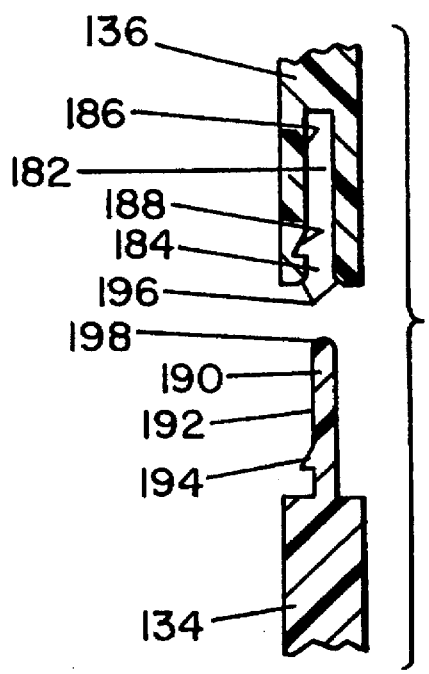
FIG. 15 is a detail sectional elevation view showing another embodiment of a snap-lock arrangement for interconnecting the cover portions of the cover shown in FIGS. 10–14.

Referring now to FIG. 15 of the drawing, there is illustrated a modification of the snap-lock arrangement between the inner wall portions and between the outer wall portions of the first and second cover portions 118 and 120 of cover 116 shown in FIGS. 10-14. In FIG. 15, the modification is illustrated in connection with outer wall portions 134 and 136 of cover portions 118 and 120, respectively, and it will be appreciated that the modification is applicable to inner wall portions 130 and 132 as well. As shown in FIG. 15, the axially inner end of outer wall portion 136 is provided radially centrally thereof with an axially extending recess 182 which, as will be appreciated from the foregoing description, extends about the periphery thereof. Recess 182 has an entrance end 184, and the radially inner wall 186 of the recess is provided adjacent entrance 184 with a groove 188 which is generally v-shaped in contour and extends peripherally about wall 186. The axially inner end of outer wall portion 134 is provided radially centrally thereof with an axially extending tongue 190 which extends about the periphery of wall portion 134 and which is of a radial thickness and axial length providing for the tongue to be axially slidably received in recess 182. Radially inner wall 192 of tongue 190 is provided with a radially inwardly extending projection 194 which is contoured and dimensioned for mating interengagement with groove 188 in recess 182 when the wall portions are axially interengaged. To facilitate introducing the axially inner end of tongue 190 into entrance end 184 of recess 182, the radially inner and outer edges of entrance 184 can be provided with beveled surfaces 196 and/or the axially outer end of tongue 190 can be provided with a rounded surface 198.

It will be appreciated that the first and second cover portions having inner and outer wall portions provided with the forgoing recess and tongue arrangement are axially snap-locked together by axially introducing tongue 190 into entrance 184 of recess 182 and then relatively advancing the tongue and recess until projection 194 on tongue 190 enters groove 188 in recess 182. During such sliding interengagement, rounded end 198 of tongue 190 and/or beveled surfaces 196 of entrance 184 facilitate introducing the tongue into the recess and, when tongue projection 194 reaches entrance end 184 of recess 182 the inclined wall of the projection cams the radially inner wall of recess 182 radially inwardly to facilitate movement of projection 194 axially into recess 182 and into alignment with groove 188. When the latter alignment is achieved, the resiliency of the material of wall portion 136 provides for the inner wall portion of recess 182 to return radially outwardly to its initial position whereby the groove and projection interengage to restrain axial separation of the two cover portions.

In use, mandrel 144 is introduced through tubular inner wall 122 of the cover as schematically illustrated in FIGURE 11 to facilitate mounting the covered reel at the wire supply station of welding apparatus, and the latter can be provided with a suitable arrangement to interengage with the cover to preclude rotation thereof about axis A in response to the pulling of wire W through the wire opening and the resulting rotation of reel 10 as the wire is unwound therefrom. Such an arrangement could, for example, include an abutment screw on the reel nose such as that described hereinabove in conjunction with FIG. 5, or the provision of a fixed post at the wire supply station interengaging with the opening through the cover handle or opening 150 therethrough.

In accordance with another aspect of the invention, it is advantageous to provide a system for identifying the welding wire type and size, especially in conjunction with a cover which remains on the reel during use, in that the cover eliminates visual inspection of the wire for this purpose. Moreover, such an identification system eliminates potential operator error with respect to determining the appropriate wire type and size for a given welding operation. Such an identification system can, for example, be provided by applying a universal product bar code strip on the reel cover, such as the bar code strip 200 shown on end wall 128 of cover 120 in FIG. 10. The bar code strip contains the desired wire information and, advantageously, can be read by reading equipment on the welding apparatus and/or by well known manually manipulated reading pens for such purpose. Such a bar code strip can be provided on any of the covers disclosed herein and, with respect to those covers which are removed from the reel prior to use of the latter, the bar code could be provided on one of the flanges of the reel in place of or in addition to the cover. It will be appreciated too, in connection with the embodiment in FIGS. 10–13, that the bar code can be provided on the outer side wall of the cover members.

While considerable emphasis has been placed on the preferred embodiments herein illustrated and described, it will be appreciated that many changes can be made in the preferred embodiments and other embodiments can be devised without departing from the principles of the present invention. Accordingly, it is to be distinctly understood that the foregoing descriptive matter is to be interpreted merely as illustrative of the present invention and not as a limitation.

Having thus described the invention it is claimed:

1. A cover for a reel of welding wire, said reel including a hub having an axis and axially spaced apart first and second flanges each extending radially outwardly from said hub and having a radially outer periphery, said hub and flanges providing a space for winding wire about said hub between said flanges, said cover comprising wall means including a wall adapted to extend circumferentially about and axially across said outer peripheries of said first and second flanges, and said wall means including means for sealing said space against the ingress of ambient air thereinto said first and second flanges respectively have first and second axially outer ends and said hub has corresponding first and second axially outer ends and an opening axially therethrough, said wall being a first wall, said wall means including a tubular second wall adapted to extend through said opening in said hub, said first and second walls each having axially opposite first and second ends respectively axially outwardly of said first and second ends of said flanges and said hub, said wall means including third and fourth walls respectively extending radially between said second ends of said first and second walls, whereby said first, second third and fourth walls enclose said reel and provide said means for sealing said space.

2. A cover according to claim 1, wherein said first, second, third and fourth walls provide said cover and said wall means includes means dividing said cover into first and second cover portions.

3. A cover according to claim 2, and means releasably interconnecting said cover portions.

4. A cover according to claim 2, wherein said means dividing said cover includes means between said first and second ends of each said first and second walls dividing each said first and second walls into axially adjacent wall portions.

5. A cover according to claim 4, wherein said axially adjacent wall portions of each said first and second walls have axially inner ends, and means respectively releasably interengaging the inner ends of the wall portions of said first wall and the inner ends of the wall portions of said second wall.

6. A cover, according to claim 5, wherein said means releasably interengaging the inner ends of said wall portions of said first and second walls include axially overlapping circumferential serrations on said inner ends.

7. A cover according to claim 1, and handle means on said wall means for carrying said cover.

8. A cover according to claim 7, wherein said first, second, third and fourth walls provide said cover and said wall means includes means dividing said cover into first and second cover portions, said handle means being integral with said wall means and including first and second handle portions respectively on said first and second cover portions.

9. A cover according to claim 1, wherein said third and fourth walls include interengaging means for vertically coaxially stacking a plurality of said covers with the third wall of one cover adjacent the fourth wall of a vertically adjacent cover.

10. A cover according to claim 9, wherein said interengaging means includes projection means extending axially outwardly from one of said third and fourth walls, and recess means extending axially inwardly from the other of said third and fourth walls.

11. A cover according to claim 1, wherein said reel is rotatable in said cover about said axis, and means on said first wall for supporting said wire during unwinding thereof from said reel.

12. A cover according to claim 11, wherein said means on said first wall includes an opening therethrough for said wire, and guide means spaced inwardly from said opening for positioning said wire relative to said opening.

13. A cover according to claim 12, wherein said guide means includes a pair of guide pins spaced apart and extending parallel to said hub axis, said wire extending between said pins and through said opening.

14. A cover according to claim 13, and sealing means for sealing against the ingress of ambient air through said opening and along said wire to the interior of said cover.

15. A cover according to claim 14, and moisture absorbing means in said cover adjacent said opening.

16. A cover for enclosing a reel of welding wire, saint reel including a hub having an axis and an axial bore therethrough and first and second flanges axially spaced apart and extending radially outwardly from said hub and having axially outer sides and radially outer peripheries, said hub and flanges providing a space for winding wire about said hub between said flanges, said cover comprising releasably interengagable first and second cover portions adapted to be assembled to enclose said reel therein, said cover portions when assembled comprising inner wall means extending through said bore and having axially opposite first and second ends, outer wall mean extending about the outer peripheries of said flanges and having axially opposite first and second ends first end wall means axially outwardly of said first flange and between said first ends of said inner and outer wall means and second end wall means axially outwardly of said second flange and between said second ends of said inner and outer wall means. said cover and said reel are independently rotatable relative to said axis, said outer wall means including an opening therethrough for feeding wire on said reel through said cover, and positioning means inwardly of said opening for positioning said wire relative to said opening.

17. A cover for enclosing a reel of welding wire, said reel including a hub having an axis and an axial bore therethrough and first and second flanges axially spaced apart and extending radially outwardly from said hub and having axially outer sides and radially outer peripheries, said hub and flanges providing a space for winding wire about said hub between said flanges, said cover comprising releasably interengagable first and second cover portions adapted to be assembled to enclose said reel therein, said cover portions when assembled comprising inner wall means extending through said bore and having axially opposite first and second ends, outer wall means extending about the outer peripheries of said flanges and having axially opposite first and second ends, first end wall means axially outwardly of said first flange and between said first ends of said inner and outer wall means and second end wall mean axially outwardly of said second flange and between said second ends of said inner and outer wall means, said cover and said reel are relatively rotatable relative to said axis, said outer wall means including an opening therethrough for feeding wire on said reel through said cover, and positioning means inwardly of said opening for positioning said wire relative to said opening. and sealing means for sealing said opening against the ingress of ambient air into said cover.

18. A cover according to claim 17, wherein said opening has an axis, said sealing means comprises a sealing member of resilient material, and means on said outer wall means engaging said sealing member against said wire.

19. A cover according to claim 18 wherein said first and second end wall means include axially interengagable means, whereby a plurality of said covers can be vertically stacked with said first end wall means of one cover adjacent said second end wall means of a vertically adjacent second cover.

20. A cover according to claim 19, wherein said positioning means includes a pair of spaced apart pins parallel to said hub axis.

21. A cover according to claim 20, and handle means on said outer wall means.

22. A cover according to claim 21, wherein said outer wall means includes means inwardly adjacent said opening for supporting moisture absorbing material means.

23. A cover for enclosing a reel of welding wire, said reel including a hub having n axis and an axial bore therethrough and first and second flanges axially spaced apart and extending radially outwardly from said hub and having axially outer sides and radially outer peripheries, said hub and flanges providing a space for winding wire about said hub between said flanges, said cover comprising releasably interengagable first and second cover portions adapted to be assembled to enclose said reel therein said cover portions when assembled comprising inner wall means extending through said bore and having axially opposite first and second ends, outer wall means extending about the outer peripheries of said flanges and having axially opposite first and second ends, first end wall means axially outwardly of said first flange and between said first ends of said inner and outer wall means and second end wall means axially outwardly of said second flange and between said second ends of said inner and outer wall means said inner wall means includes first and second inner wall portions respectively extending axially inwardly from said first and second end wall means and having axially inner ends, said outer wall means includes first and second outer wall portions respectively extending axially inwardly from said first and second end wall means and having axially inner ends, said first end wall means and said first inner and outer wall portions providing said first cover portion, and said second end wall means and said second inner and outer wall portions providing said second cover portion, and means for releasably interconnecting said axially inner ends of said inner wall portions and said axially inner ends of said outer wall portions.

24. A cover according to claim 23, wherein said first and second end wall means include axially interengagable means, whereby a plurality of said covers can be vertically stacked with said first end wall means of one cover adjacent said second end wall means of a vertically adjacent second cover.

25. A cover according to claim 23, and handle means on said outer wall means for carrying said cover.

26. A cover according to claim 23, wherein said means for releasably interconnecting said axially inner ends includes axially interengaging serrations on said axially inner ends of said inner wall portions and on said axially inner ends of said outer wall portions.

27. A cover according to claim 23, wherein said axially inner ends of said first and second outer wall portions respectively include first and second handle portions extending radially outwardly with respect to said hub axis, said handle portions together providing a handle for carrying said cover.

28. A cover according to claim 23, wherein each of said first and second end wall means has an axially outer side, one of said first and second end wall means and the corresponding end of said inner wall means having a recess therebetween extending axially inwardly from the axially outer side of said one end wall means, and the other of said end wall means including a projection extending axially outwardly of the axially outer surface thereof, said projection on a first cover being receivable in said recess of a second adjacent cover for vertically stacking said first and second covers against lateral displacement relative to said hub axis.

29. A cover according to claim 23, wherein said axially inner ends of said first and second outer wall portions respectively include first and second nose means integral therewith and having axially opposed inner sides, axially opposed wire receiving recesses in said opposed inner sides providing an opening for feeding wire from said reel through said cover, said opening having an axis, wire positioning means spaced axially inwardly of said opening for positioning said wire relative thereto, and sealing means between said positioning means and said opening for sealing against the ingress of ambient air into said cover through said opening.

30. A cover according to claim 29, wherein said positioning means includes a pair of pins parallel to said hub axis and on diametrically opposite sides of said opening axis.

31. A cover according to claim 29, further including means providing desiccant recesses in said opposed inner sides of said nose means, and moisture absorbing means in said desiccant recess.

32. A cover according to claim 29, and a seal recess in one said opposed inner sides of said nose means and a post member opposite said recess, said recess and said post member being between said positioning means and said opening, said sealing means including a resilient sealing member in said seal recess, and said post member engaging said wire against said sealing member.

33. A cover according to claim 32, wherein said positioning means includes a pair of pins parallel to said hub axis and on diametrically opposite sides of said opening.

34. A cover according to claim 33, wherein each of said first and second end wall means has an axially outer side, one of said first and second end wall means and the corresponding end of said inner wall means having a recess therebetween extending axially inwardly from the axially outer side of said one end wall means, and the other of said end wall means including a projection extending axially outwardly of the axially outer surface thereof, said projection on a first cover being receivable in said recess of a second adjacent cover for vertically stacking said first and second covers against lateral displacement relative to said hub axis.

35. A cover according to claim 34, wherein said axially inner ends of said first and second outer wall portions respectively include first and second handle portions extending radially outwardly with respect to said hub axis, said handle portions together providing a handle for carrying said cover.

36. A cover according to claim 35, wherein said means for releasably interconnecting said axially inner ends includes axially interengaging serrations on said axially inner ends of said inner wall portions and on said axially inner ends of said outer wall portions.

37. A cover according to claim 36, further including desiccant recesses in said opposed inner sides of said nose means, and moisture absorbing means in said desiccant recess.

* * * * *